B. BILDERBACK.

METALLIC SMOKEHOUSE.

APPLICATION FILED JULY 12, 1920.

Reissued Oct. 26, 1920. 14,965.

Inventor:
Bart Bilderback
by Thurston, Knox & Hudson
attys.

UNITED STATES PATENT OFFICE.

BART BILDERBACK, OF ROCKVILLE, INDIANA, ASSIGNOR TO CLEVELAND ELECTRIC MACHINE AND MANUFACTURING COMPANY, OF CLEVELAND, OHIO, A CORPORATION OF OHIO.

METALLIC SMOKEHOUSE.

14,965. Specification of Reissued Letters Patent. Reissued Oct. 26, 1920.

Original No. 1,327,937, dated January 13, 1920, Serial No. 322,178, filed September 6, 1919. Application for reissue filed July 12, 1920. Serial No. 395,774.

*To all whom it may concern:*

Be it known that I, BART BILDERBACK, a citizen of the United States, residing at Rockville, in the county of Parke and State of Indiana, have invented a certain new and useful Improvement in Metallic Smokehouses, of which the following is a full, clear, and exact description.

My invention relates to smoke-houses adapted to curing meat by the use of a combination of heat, smoke and evaporation, and the objects of the invention are; first, to provide a smoke-house which will efficiently distribute the heat and smoke evenly and to all parts of the meat treated therein; second, to provide such a device which will afford proper collection and drainage of all liquids evaporated from the meat; third, to provide such a device which will require a minimum fuel supply and produce a maximum curing power therefrom; fourth, to provide such a device which will be indestructible and free of danger from fire or other similar action; and fifth, to provide such a device which will be sightly, compact and economical in construction and installation.

These objects I attain by means of the device shown in the accompanying drawings, in which.

Similar letters of reference refer to similar parts throughout the several views.

The body, A, of the device consists of a housing or cabinet composed of four walls, a top and a bottom, as shown, all of which are constructed of substantial sheet metal.

The front wall of the housing is provided with double doors, *b* which tightly close the upper compartment, C, and a furnace door, *d*, which is provided with a damper *e*, and which closes the lower compartment or fire box, *g*.

The inner edge of the double doors, *b*, are flanged or offset to overlap each other smoothly and are provided with a substantial two-bolt lock, *j*, which binds the two doors closely together and against the face of the cabinet, A.

Figure 1:
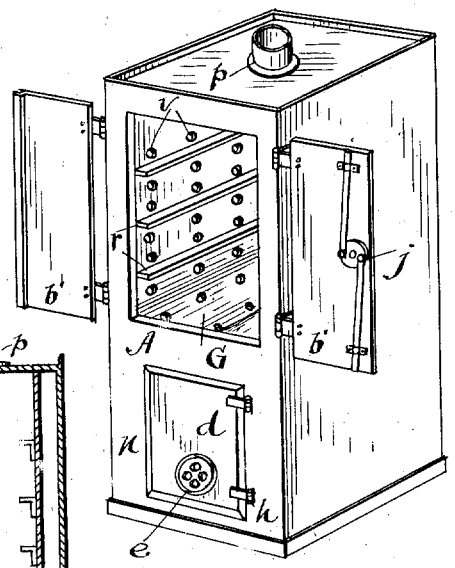
Figure 1, is a perspective view of the device.
Figure 2:
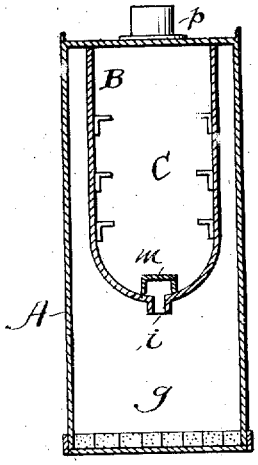
Fig. 2, is a view of the device with the front wall removed and showing the internal construction thereof.

The letter B, indicates an inner wall, one of which is suitably mounted just within the upper portion of each side wall, and which extends from the top of the cabinet, in a curved like manner, as shown in Fig. 2, to a point slightly above the furnace door, *d*.

The inwardly curved ends of the inner walls, *b*, are flanged downwardly, leaving an open space between the two, thus forming a slot-like drain, *i*, adapted to discharge all drippings conducted thereto by the curved side of the inner wall.

A metallic shield, *m*, in the form of an inverted trough, is suitably mounted above the drain, *i*, with only sufficient open space between the edge thereof and the corresponding inner walls to permit the drainage of drippings, and is adapted to prevent the passage of excessive heat and as ashes from the fire-box into the upper chamber.

The inner walls, B, are properly spaced from the corresponding side walls to provide flue-like spaces, *o*, through which heat and smoke is drawn by the draft from the smoke-pipe, *p*, into the upper portion of the cabinet; and the inner walls are provided with a multiplicity of openings forming perforations or vents, *v*, which admit heat and smoke in a spraylike manner to all parts of the upper chamber, C.

A series of metallic L-shaped cleats, *r*, is mounted upon the inner face of each inner wall, B, in pairs, for the purpose of supporting gratings, racks or other supports for meat while curing.

The oppositely disposed walls B with their converging lower portions, form an inner housing or container which serves to protect the meat being treated from direct contact with the fire, and to provide an even distribution of the heat and smoke from the fire to the contents of the inner housing.

The fire-box door, *d*, is suitably mounted upon substantial hinges, *h*, and is provided with a suitable catch, *n*.

The bottom of the housing or cabinet, A, is floored with fire bricks upon which the fire is built.

It is obvious, that to cure meat in my smoke-house, the meat is placed in the upper portion, C, thereof, and a fire is built upon the brick floor, *s*, the smoke and heat from which passes upwardly through the flue-like spaces, *o*, between the double side walls, and from there said smoke and heat is discharged in a spray-like manner through the many vents, *v*, directly upon all parts of the meat within the upper chamber, C. All moisture and other dripping from the curing meat falls upon the sloping inner walls, B, and is discharged by gravity through the slot-like drain, *i*, immediately over the fire, whereby all drippings are consumed or evaporated. A suitable flue-pipe, *p*, is provided in the top of the cabinet whereby proper draft and discharge of smoke and fumes is afforded.

The advantages claimed for my smoke-house, over other devices used prior hereto for like purposes, consists; first, in the indestructible structure thereof; second, the compact and space-saving formation; third, the perfect distribution of smoke and heat to all parts of the meat, whereby a more perfect and quicker curing of the meat is accomplished; and the economy attained in the reduction of fuel and time necessary to cure meat, as well as in the production costs of the smoke-house.

Having described my invention, I claim—

1. A smoke house comprising an outer housing and an inner housing occupying a portion of the interior of the outer housing, said inner housing being adapted to contain a product to be cured, the top of the outer housing serving as a top closing member for the inner housing, the walls of the inner housing being provided with openings for the purpose described.

2. A smoke house comprising an outer housing and an inner housing, there being spaces for the passage of smoke between the walls of the inner housing and the outer housing, the walls of the inner housing extending substantially to the front wall of the outer housing, said front wall being provided with an opening which communicates with the interior of the inner housing and a door for closing said opening, the walls of the inner housing being provided with openings for the purpose described.

3. A smoke house comprising an outer housing and an inner housing, said inner housing being closed at the top thereof by the top wall of the outer housing, the said walls of the inner housing being spaced from the side walls of the outer housing to provide spaces for the passage of smoke, the side walls of the inner housing extending substantially to the front wall of the outer housing, said front wall being provided with an opening and a door carried by the outer housing for closing said opening, the walls of the inner housing being provided with openings for the purpose described.

4. A smoke-house comprising an outer housing and an inner housing, occupying a portion of the interior of the outer housing, the walls of the inner housing being provided with openings, the outer housing having a smoke outlet which directly communicates with the interior of the inner housing.

5. A smoke-house comprising an outer housing and an inner housing, occupying a portion of the interior of the outer housing, said inner housing being provided with a drain outlet adjacent the lower portion, the walls of the inner housing being provided with openings for the purpose described.

6. A smoke-house comprising an outer housing and an inner housing, the inner housing being provided upon the interior thereof with supporting means, said inner housing being provided with a drain outlet adjacent the lower part thereof, the walls of the inner housing being provided with openings.

7. A smoke-house comprising an outer housing and an inner housing, occupying the upper portion of the interior of the outer housing whereby there is provided a fire compartment at the lower portion of the inner housing being spaced from walls of the outer housing to provide smoked passageways, the walls of the inner housing being provided with openings, the outer housing being provided with a flue outlet which directly communicates with the interior of the inner housing.

8. A smoke-house comprising an outer housing, a pair of oppositely disposed walls extending from the front to the rear walls of the said outer housing thereby inclosing a space adapted for the reception of meat to be cured, the said walls being spaced from the side walls of the outer housing to provide smoked passageways, there being a drain opening provided at the lower portion of the space inclosed by the said walls, and said walls being provided with openings therein, the outer housing being provided with a flue opening which communicates directly with the space containing the meat to be cured.

9. In a metallic smoke-house, a housing or cabinet consisting of all metallic walls, top and bottom; a pair of metallic inner-walls, spaced from the side walls and curved inwardly at the lower ends, toward each other, a flue-like space between the corresponding inner and outer walls, a multiplicity of vents formed in the inner-walls, a series of cleats mounted in pairs upon the inner walls, a slot-like drain formed between the lower edges of the inner walls, a shield mounted above the slot-like drain, a fire-box formed in the lower part of the housing and floored with fire brick, a meat-curing chamber formed between the inner walls, suitable doors adapted to close the upper or meat curing chamber and the fire-box, and a suitable smoke-pipe located in the top of the housing, all substantially as described and shown and for the purposes set forth.

10. In a smoke-house, a housing or cabinet consisting of double walls, a top and bottom, and comprising a curing chamber in the upper portion and a fire-box in the lower portion, inner walls spaced from the outer walls and inclosing the curing-chamber, said inner walls being curved inwardly at their lower ends, a slot-like drain formed between the lower ends of said inner walls, a multiplicity of vents in said inner-walls, spaces between the outer and inner walls and forming flues, a suitable smoke-pipe leading from the top of the cabinet, a shield mounted immediately over the slot-like drain, a fire-brick flooring in the fire-box, and suitable doors adapted to close the upper and lower portions of the cabinet, all substantially as described and shown and for the purposes set forth.

11. In a smoke-house, a housing or cabinet, consisting of a curing-chamber and a fire-box, inner walls inclosing said curing-chamber, spaces formed between the outer walls and said inner walls adapted to draw smoke and heat from the fire-box, a multiplicity of perforations forming vents in said inner walls adapted to discharge smoke in a spraylike manner to all parts of the curing-chamber, a suitable drain formed between the lower edges of said inner-walls, a shield mounted over said drain, a smoke-pipe adapted to furnish draft to the fire-box, and suitable doors adapted to closely close the curing-chamber and fire-box, all substantially as described and shown and for the purposes set forth.

In testimony whereof, I hereunto affix my signature.

BART BILDERBACK.